(12) United States Patent
Llamas Sandín et al.

(10) Patent No.: US 9,718,535 B2
(45) Date of Patent: Aug. 1, 2017

(54) AIRCRAFT WITH A TRIMMABLE HORIZONTAL STABILIZER HAVING THE PIVOT ELEMENTS IN ITS FORWARD SIDE

(71) Applicant: AIRBUS OPERATIONS S.L., Getafe (Madrid) (ES)

(72) Inventors: Raúl Llamas Sandín, Getafe (ES); Miguel Luque Buzo, Getafe (ES); José Luis Martínez Muñoz, Getafe (ES)

(73) Assignee: Airbus Operations S.L., Madrid (ES)

( * ) Notice: Subject to any disclaimer, the term of this patent is extended or adjusted under 35 U.S.C. 154(b) by 155 days.

(21) Appl. No.: 14/587,590

(22) Filed: Dec. 31, 2014

(65) Prior Publication Data
US 2015/0183509 A1    Jul. 2, 2015

(30) Foreign Application Priority Data
Dec. 31, 2013    (EP) ..................................... 13382578

(51) Int. Cl.
*B64C 9/00* (2006.01)
*B64C 9/08* (2006.01)
(Continued)

(52) U.S. Cl.
CPC .................. *B64C 9/08* (2013.01); *B64C 1/26* (2013.01); *B64C 5/02* (2013.01); *B64C 9/02* (2013.01); *B64C 13/28* (2013.01)

(58) Field of Classification Search
CPC .... B64C 1/26; B64C 5/10; B64C 5/16; B64C 9/02; B64C 9/08; B64C 13/28
See application file for complete search history.

(56) References Cited

U.S. PATENT DOCUMENTS 4,717,097 A * 1/1988 Sepstrup .................. B64C 3/50
244/215
5,692,704 A * 12/1997 Buttgereit ................. B64C 1/26
244/119
(Continued)

FOREIGN PATENT DOCUMENTS

| DE | 10 2005 003 297 | 7/2006 |
| EP | 0 239 138 | 9/1987 |
| EP | 1 426 290 | 6/2004 |

OTHER PUBLICATIONS

EP Search Report for EP 13 38 2578.6, dated Jun. 5, 2014, 6 pages.

*Primary Examiner* — Philip J Bonzell
(74) *Attorney, Agent, or Firm* — Nixon & Vanderhye P.C.

(57) ABSTRACT

The invention provides an aircraft with a trimmable horizontal stabilizer (13) that not requires a cut-out in resistant areas of the rear fuselage and that occupies less space that in conventional horizontal stabilizers. The rear fuselage (5) comprises at least a first section (9) having a resistant fuselage and a second section (11), aft of the first section, having a non-resistant fuselage (i.e. a fairing). The load-bearing structure (30) of the horizontal stabilizer and the trimming actuator (50) are disposed inside said second section (11). The pivot element (41) is mounted on its forward side and coupled to the first section (9) of the rear fuselage. The connection fitting (21) is mounted on its rearward side and the trimming actuator (50) is disposed so that it exerts a force in the direction of the Z-axis of the aircraft on the connection fitting (21) during a trimming operation.

9 Claims, 3 Drawing Sheets

(51) Int. Cl.
*B64C 1/26* (2006.01)
*B64C 5/02* (2006.01)
*B64C 9/02* (2006.01)
*B64C 13/28* (2006.01)

(56) References Cited

U.S. PATENT DOCUMENTS

| | | | |
|---|---|---|---|
| 7,604,200 B2 * | 10/2009 | Garcia Laja | B64C 1/26 244/131 |
| 7,810,758 B2 * | 10/2010 | Garcia Laja | B64C 1/12 244/119 |
| 8,118,260 B2 | 2/2012 | Rodriguez | |
| 8,360,359 B2 * | 1/2013 | Llamas Sandin | B64C 5/02 244/87 |
| 8,960,031 B2 * | 2/2015 | Keech | B64C 5/02 244/99.3 |
| 2008/0001029 A1 | 1/2008 | Garcia Laja | |
| 2010/0148000 A1 | 6/2010 | Llamas Sandin et al. | |

\* cited by examiner

AIRCRAFT WITH A TRIMMABLE HORIZONTAL STABILIZER HAVING THE PIVOT ELEMENTS IN ITS FORWARD SIDE

This claims priority to EP 13382578.6 filed Dec. 31, 2013, the entire contents of which is hereby incorporated by reference.

FIELD OF THE INVENTION

The invention relates to horizontal stabilizers of aircraft and more particularly to the configuration of their trimming means.

BACKGROUND

As is known, a trimmable horizontal stabilizer is used to stabilize the attitude of an aircraft and to control it about its lateral axis. For this purpose the horizontal stabilizer is moved about an axis running parallel to the aircraft lateral axis (Y-axis), so that it can be trimmed an angle comprised in a predetermined range.

A conventional horizontal stabilizer is pivotally mounted on the rear fuselage of an aircraft for rotating about a lateral axis coupled to the rearward side of the horizontal stabilizer. The trimming is typically carried out by means of an actuator, usually called TSHA (initials of Trimmable Horizontal Stabilizer Actuator), such as that described in EP 1 426 290 A1, acting on the forward side of the horizontal stabilizer. The actuator is joined to the fuselage by means of a special fitting such as those described in US 2008/001029 and WO 2010049570 A2.

In most aircraft there is a cut out in resistant areas of the rear fuselage that serve to install the trimmable horizontal stabilizer but this arrangement has the disadvantage of weakening the rear fuselage.

Another disadvantage of conventional trimmable horizontal stabilizers is that they require a large space inside the fuselage.

SUMMARY OF THE INVENTION

An object of the invention is to provide an aircraft with a trimmable horizontal stabilizer that occupies less space in the rear fuselage, allowing therefore more space for passengers and/or cargo.

Another object of the invention is to provide an aircraft with a trimmable horizontal stabilizer that not requires a cut-out in resistant areas of the rear fuselage.

These and other objects are met by an aircraft comprising a fuselage and a trimmable horizontal stabilizer in its rear zone actuated by a trimming actuator. The load bearing structure of the trimmable horizontal stabilizer comprises a portion disposed inside the rear fuselage that includes at least one pivot element coupled to a pivoting device for rotating about a lateral axis and a connection fitting with the trimming actuator. The rear fuselage comprises at least a first section having a resistant fuselage and a second section, aft of the first section, having a non-resistant fuselage (i.e. a fairing). Said portion of the load-bearing structure and said trimming actuator are disposed inside said second section of the rear fuselage. The at least one pivot element is mounted on the forward side of said portion of the load-bearing structure and coupled to the first section of the rear fuselage. The connection fitting is mounted on the rearward side of said portion of the load-bearing structure and the trimming actuator is disposed so that it exerts a force in the direction of the Z-axis of the aircraft on the connection fitting during a trimming operation. The aircraft also comprises a supporting structure of the trimming actuator in the second section arranged for transmitting the trimming actuator loads to the first section.

In an embodiment of the invention the pivoting device is fixed to a bulkhead located at the end of the first section of the rear fuselage and the supporting structure for the trimming actuator is arranged for transmitting the actuator loads to the bulkhead and to the rest of the first section of the rear fuselage when the horizontal stabilizer is trimmed.

The load-bearing structure of the trimmable horizontal stabilizer of the invention can be a torsion box comprising forward and rear spars and upper and lower skins.

An embodiment of the supporting structure of the trimming actuator is a truss structure including longitudinal beams extended from the bulkhead to a point beyond the trimming actuator.

Other characteristics and advantages of the present invention will be clear from the following detailed description of embodiments illustrative of its object in relation to the attached figures.

DETAILED DESCRIPTION OF THE INVENTION

Figure 1:
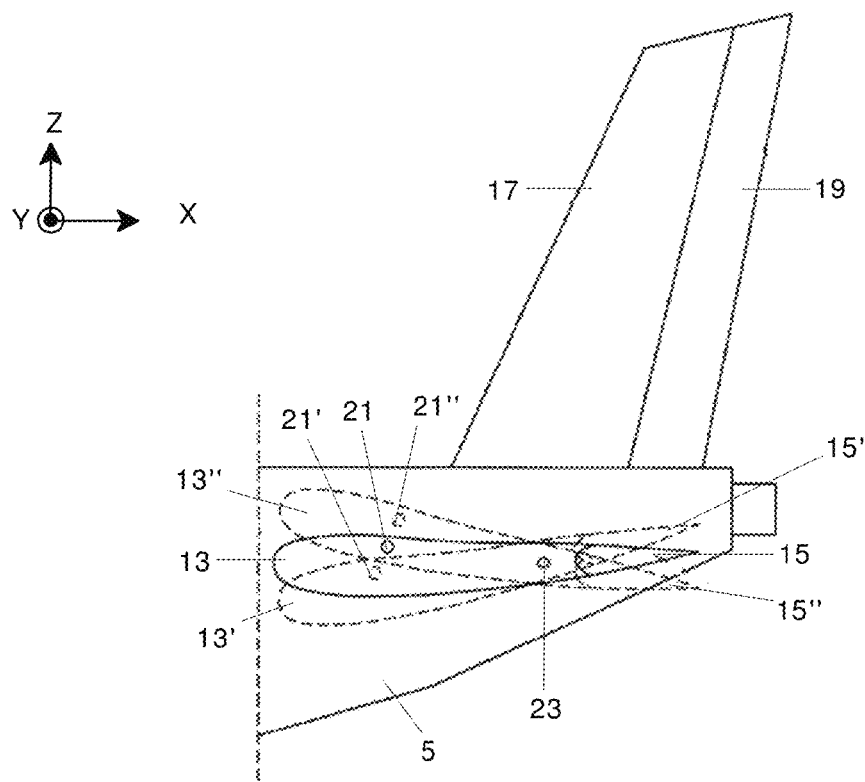
FIG. 1 is a side view of the rear section of an aircraft provided with a trimmable horizontal stabilizer.

FIG. 1 shows the rear fuselage 5 of an aircraft provided with a horizontal stabilizer 13 with its elevator 15 and a vertical stabilizer 17 with its rudder 19.

The horizontal stabilizer 13 is trimmable by means of a trimming actuator (not shown) linked to a connecting fitting 21, the actuation of which causes the horizontal stabilizer 13 to pivot about a pivot device, thus rotating about a lateral axis 23 (an axis in the direction of the Y-axis of the aircraft), so that the horizontal stabilizer 13, the elevator 15 and the connection fitting 21 can adopt the positions shown with, respectively, the references 13', 13"; 15', 15"; 21', 21".

As is known in the art, the trimming actuator is arranged so that, although the movement of the connecting fitting 21 does not follow a vertical line as illustrated in FIG. 1, the load transferred by the actuator to the fuselage when the horizontal stabilizer 13 is trimmed is virtually a pure vertical load. In this specification the term "vertical" shall be understood as the direction of the Z-axis of the aircraft.

Figure 2:
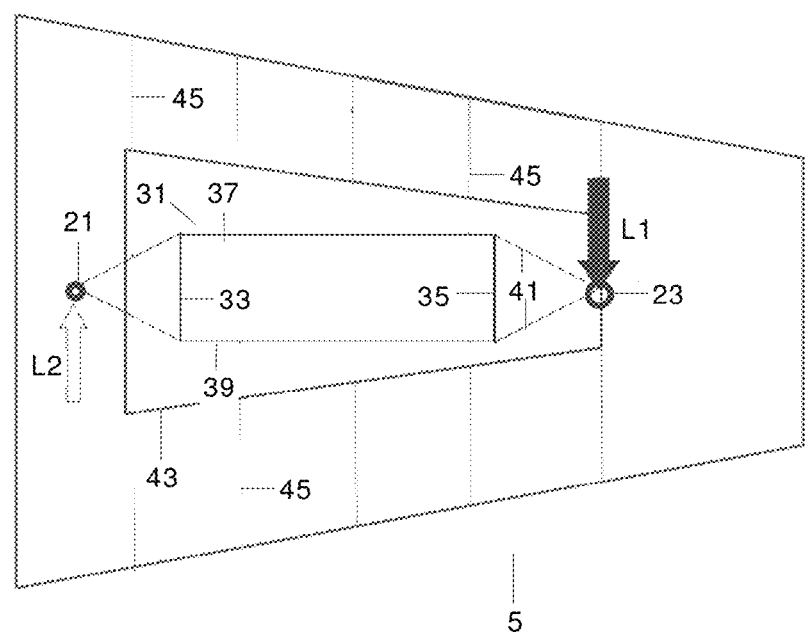
FIG. 2 is a side view sketch of the configuration of a known trimmable horizontal stabilizer.

A conventional trimmable horizontal stabilizer 13 is configured and structurally connected to the rear fuselage 5 as follows (see FIG. 2).

The load-bearing structure of the horizontal stabilizer 13 extending in its span direction has a portion 31 inside the rear fuselage 5 configured typically as a torsion box comprising a forward spar 33, a rear spar 35 and upper and lower skins 37, 39. The central portion 31 comprises pivot elements 41 attached to the rear spar 35 which are coupled to a pivot device attached to the rear fuselage 5 for rotating about a lateral axis 23 and a connection fitting 21 for the trimming actuator attached to the forward spar 33.

A cut-out 43 in the rear fuselage 5, affecting the frames 45, serves to install the horizontal stabilizer 13. The load of the horizontal stabilizer 13 is shared between the load L1 transferred to said pivot device allowing the rotation about the lateral axis 23 and the vertical load L2 that is reacted by the trimming actuator which is joined to the fuselage by means of suitable fittings. The proportion between L1 and L2 depends on the particular configuration of the whole horizontal stabilizer although generally L1 is much bigger than L2. The surrounding area of the cut-out 43 shall be reinforced with beams.

In a backward swept horizontal stabilizer most of the load is transferred through the rear spar to the pivot device and that is why the cut out must be reinforced with beams. Around a third of the vertical load is reacted by the trimming actuator. Lateral loads and torsion moment are reacted as well in the pivot device.

Figure 3:
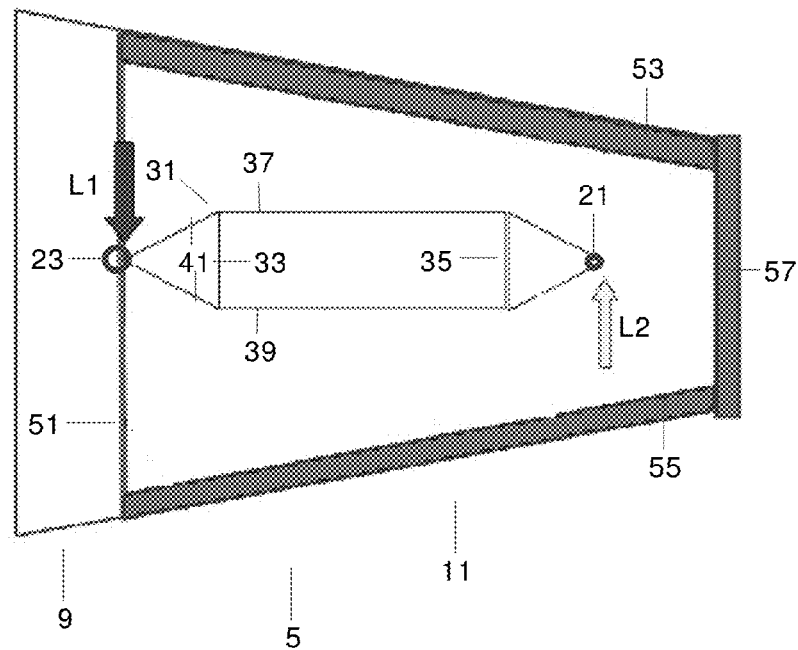
FIG. 3 is a side view sketch of the configuration of a trimmable horizontal stabilizer with the main features of the invention.
Figure 4:
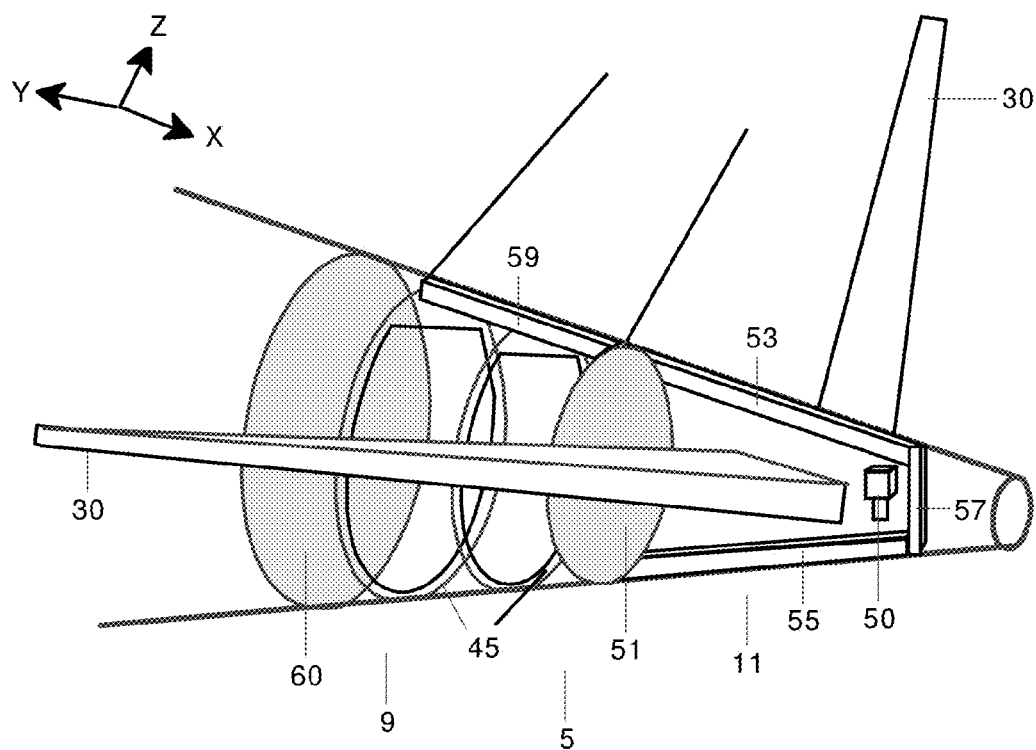
FIG. 4 is a schematic perspective view of the rear section of an aircraft illustrating an embodiment of the invention.

A trimmable horizontal stabilizer 13 having the same load-bearing structure is configured and connected structurally to the rear fuselage 5, according to the invention, as follows (see FIGS. 3 and 4).

The rear fuselage 5 comprises a first section 9 having a resistant fuselage, i.e. a fuselage comprising a skin reinforced by longitudinal stringers and transversal frames 45, and a second section 11 having a non-resistant fuselage, i.e. a fairing suitably configured as a continuation of the first section 9. The rear pressure bulkhead 60 is located at the beginning of the first section 9.

The central portion 31 of the load-bearing structure 30 of the trimmable horizontal stabilizer 13 is disposed inside the second section 11 of the rear fuselage 5 and comprises pivot elements 41, attached to its forward spar 33 that are coupled to a pivot device attached to a bulkhead 51 located at the rear end of the first section 9 of the rear fuselage 5 for rotating about a lateral axis 23, and a connection fitting 21 for the trimming actuator 50 attached to the rear spar 35.

The trimming actuator 50, which can be the one described in EP 1 426 290, is supported by a truss structure formed by upper and lower longitudinal beams 53, 55, along the X-axis of the fuselage, joined to the bulkhead 51 and extended to the end of the second section 11, aft to the trimming actuator 50, and a vertical beam 57 joined to the rear ends of the longitudinal beams 53, 55.

The rear fuselage 5 may also include an upper longitudinal torsion box 59 (see FIG. 4) extended from the bulkhead 51 in an opposite direction to the upper longitudinal beam 53 that will aid to transfer bending loads coming from the truss structure to the second section 11 of the rear fuselage 5.

A comparison between both horizontal stabilizers shows that the horizontal stabilizer of the invention has the following advantages:

There is no need of a cut-out 43 in a resistant area of the rear fuselage 5 (a zone affected by the structural loads introduced by the horizontal and vertical stabilizers) as the forward spar 33 is attached to the bulkhead 51 and the actuator load L1 and the associated bending moment are transferred by the above-mentioned truss structure to the bulkhead 51 located in the first section 9 of the rear fuselage 5. The central portion 31 of the load bearing structure 30 of the horizontal stabilizer 13 is located in a section covered by a simple fairing so that the cut-out needed by said central portion 31 does not involve any structural problem.

The rear position of the trimming actuator 50 allows moving the rear pressure bulkhead 60 aftwards allowing more space inside the cabin to add seat rows, trolleys or toilets.

Figure 5:
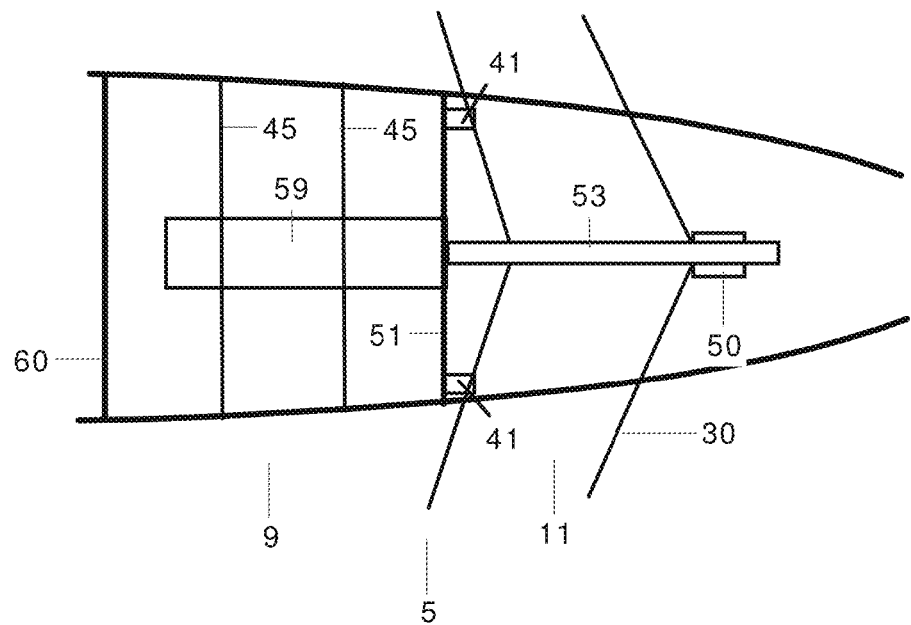
FIG. 5 is a schematic plan view of the rear section of an aircraft illustrating an embodiment of the invention.

The horizontal stabilizer 13 according to the invention is particularly advantageous for a forward swept horizontal stabilizer (see FIGS. 4, 5 and 6) because in this case the main loads are taken by the forward spar 33. FIG. 5 shows a configuration with two pivot elements 41 in each side of the central portion 31 of the torsion box.

Figure 6:
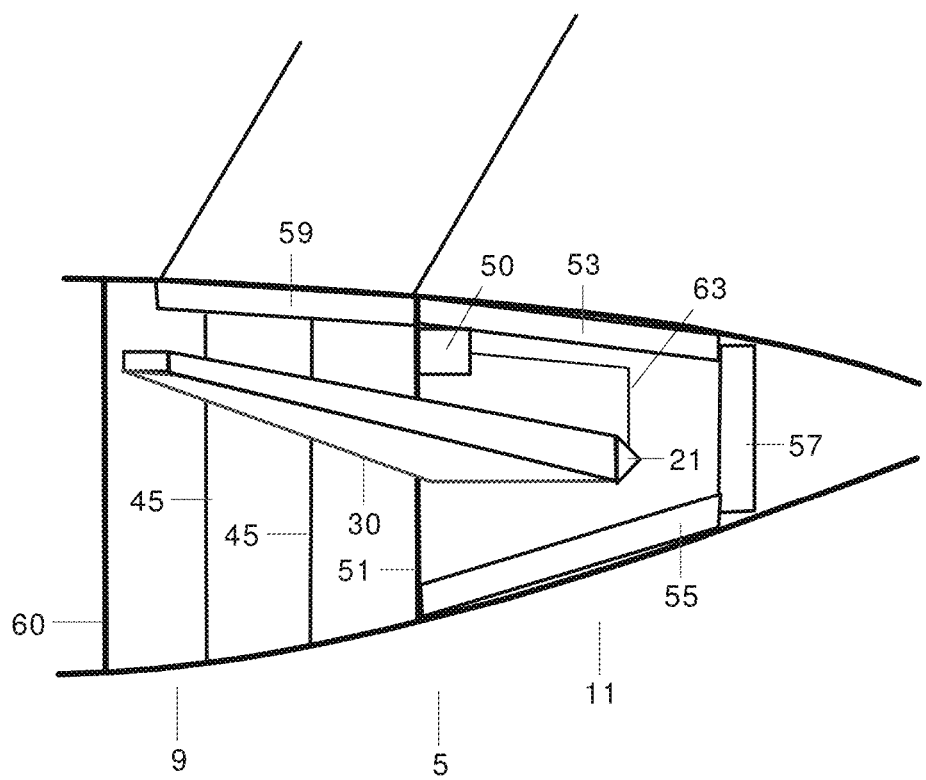
FIG. 6 is a schematic perspective view of the rear section of an aircraft illustrating another embodiment of the trimming actuator of the invention.

FIG. 6 shows an alternative embodiment of the trimming actuator 50 comprising a rotor actuator 61 positioned close to the bulkhead 51 and connected to the connection fitting 21 by an arrangement 63 of rods or cables to pull up or down the horizontal stabilizer 13 in the Z-direction of the aircraft.

Although the present invention has been described in connection with various embodiments, it will be appreciated from the specification that various combinations of elements, variations or improvements therein may be made, and are within the scope of the invention.

The invention claimed is:

1. An aircraft comprising:
a fuselage;
a trimmable horizontal stabilizer in a rear zone of the fuselage, the trimmable horizontal stabilizer is actuated by a trimming actuator;
the trimmable horizontal stabilizer comprising a load-bearing structure extending in a span direction;
the load-bearing structure having a portion disposed inside the rear zone of the fuselage that includes at least one pivot element coupled to a pivoting device configured to rotate about a lateral axis and a connection fitting connected to the trimming actuator;
wherein:
the rear zone of the fuselage comprises at least a first section, and a second section, aft of the first section, wherein the first section of the rear fuselage comprises a bulkhead having the pivoting device coupled to the at least one pivot element of the trimmable horizontal stabilizer;
said portion of the load-bearing structure and said trimming actuator are disposed inside the second section of the rear zone of the fuselage;
the at least one pivot element is mounted on a forward side of said portion of the load-bearing structure and coupled to the pivoting device on the bulkhead of the first section of the rear zone of the fuselage;
the connection fitting is mounted on a rearward side of said portion of the load-bearing structure and is connected to the trimming actuator which is disposed to exert a force in a Z-axis direction of the aircraft via the connection fitting during a trimming operation; and
a supporting structure for the trimming actuator is in the second section of the rear zone of the fuselage and is arranged to transmit trimming actuator loads from the trimming actuator to the first section,
wherein the supporting structure of the trimming actuator comprises upper and lower longitudinal beams joined to the bulkhead of the fuselage and extending to a position aft of the connection fitting, and a vertical beam joined to rear ends of the upper and lower longitudinal beams.

2. The aircraft according to claim 1, wherein:
the load-bearing structure is a torsion box comprising forward and rear spars and upper and lower skins;

the at least one pivot element is mounted on the forward spar and the connection fitting for the trimming actuator is mounted on the rear spar.

3. The aircraft according to claim 1, wherein the trimming actuator comprises a rotor actuator positioned close to the bulkhead and an arrangement of rods or cables to exert a force in the direction of the Z-axis of the aircraft over the connection fitting.

4. The aircraft according to claim 1, wherein the horizontal stabilizer is a forward swept horizontal stabilizer.

5. An aircraft comprising:
a fuselage;
a trimmable horizontal stabilizer including a load bearing structure extending through a rear zone of the fuselage,
a trimming actuator mounted within the rear zone and coupled to a connection fitting attached to an aft region of the load bearing structure;
a pivot element coupled a front region of the load bearing structure and pivotably attached to a bulkhead of the fuselage at a pivot point, wherein the pivot element is configured to pivot at least a portion the trimmable horizontal stabilizer about the pivot point;
the connection fitting is connected to a rear region of the load-bearing structure and connected to the trimming actuator, wherein the trimming actuator moves the connection fitting which pivots the at least a portion of the trimmable horizontal stabilizer about the pivot point; and
a supporting structure including upper and lower longitudinal beams joined to the bulkhead and extending aft in the fuselage beyond the connection fitting, and a connecting beam bridging rear ends of the upper and lower longitudinal beams, wherein the supporting structure supports the trimming actuator.

6. The aircraft of claim 5 wherein the load bearing structure is a torsion box and the front region is a front spar of the torsion box and the rear region is a rear spar of the torsion box.

7. The aircraft of claim 5 wherein the trimmable horizontal stabilizer includes a forward swept stabilizer.

8. The aircraft of claim 5 wherein the pivot element includes a first pivot element and a second pivot element each pivotably attached to the bulkhead and separated in a lateral direction within the fuselage.

9. The aircraft of claim 5 wherein the trimming actuator is proximate the connecting beam.

* * * * *